Sept. 26, 1972 C. H. STEVENS 3,694,145

ADJUSTABLE SHIM FOR PRESSURE VESSEL DOORS

Filed Nov. 10, 1970 2 Sheets-Sheet 1

INVENTOR.
CHARLES H. STEVENS

BY Theodore B. Roessel

ATTORNEY

ADJUSTABLE SHIM FOR PRESSURE VESSEL DOORS
Filed Nov. 10, 1970 2 Sheets-Sheet 2
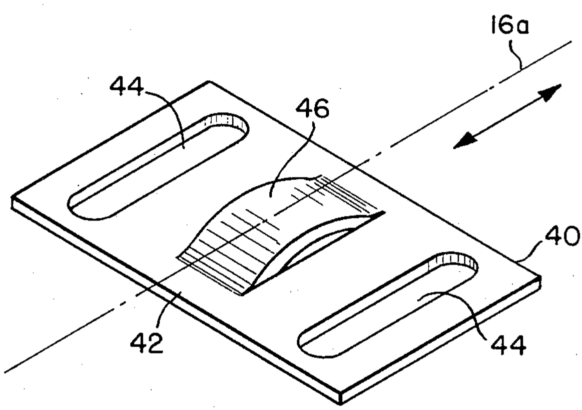
FIG. 3
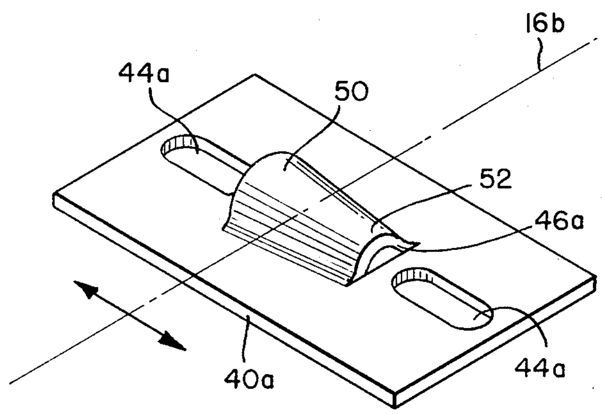
FIG. 4
INVENTOR.
CHARLES H. STEVENS
BY
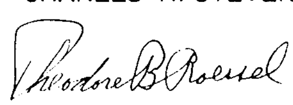
ATTORNEY United States Patent Office 3,694,145
Patented Sept. 26, 1972

1

3,694,145
ADJUSTABLE SHIM FOR PRESSURE VESSEL DOORS
Charles H. Stevens, Honeoye Falls, N.Y., assignor to Sybron Corporation, Rochester, N.Y.
Filed Nov. 10, 1970, Ser. No. 88,452
Int. Cl. B01j *3/00;* A61l *3/02*
U.S. Cl. 21—91 6 Claims

ABSTRACT OF THE DISCLOSURE

An adjustable shim in combination with the door closing apparatus of sterilizer or other pressure vessel doors. The shim 40 carried by the door 32 is adjustable longitudinally of the toggle or locking bar 16 to raise or lower each bar for providing a uniform sealing force about the periphery of the door.

BACKGROUND OF THE INVENTION

The present invention relates to doors for pressure vessels such as sterilizers and the like and, in particular, to an adjustable shim which facilitates the adjustment of the door sealing apparatus.

One type of closure for pressure vessels, in particular, sterilizers, employs a plurality of toggle or locking bars carried by the door for sealing the door against the vessel opening. The bars extending generally radially from the center of the door with the outward ends of the bars being adapted to engage a lip formed about the vessel opening. The other end of the bars are carried on an axially movable member which pivots the toggles into engagement with the lip and against the door thereby securing the door firmly in a sealed position.

One problem in constructing such a door is that the lip engaged by the toggle may not be uniform over the entire periphery of the vessel opening. This requires that the height of each toggle from the door be adjusted to insure that the outward end of each bar engages the lip in a manner providing a uniform sealing force about the entire periphery of the door. Heretofore, such adjustments were made by building up with shims the portions of the door against which the toggle bars exerted the closing force. This involved a trial and error process make time consuming by the repeated removal and replacement of shims until the proper shim height is obtained. The present invention, then, provides for an adjustable shim wherein the proper shim height is obtained by a simple adjustment which reduces trial and error adjustments and which does not require complete removal of the shim.

SUMMARY OF THE INVENTION

The present invention may be characterized in one aspect thereof by the provision of adjustable shims which are attached to the sterilizer door. The upper surface of the shims are generally convex and receive the sealing force exerted by the toggle bars. The shims are adjustable on the door in a direction parallel to the longitudinal axis of the toggles for moving the highest point of the convex surface along the toggle bar to raise or lower each bar. In another embodiment of the invention, the adjustable shims have their upper surfaces inclined in a direction transverse of the toggle bar wherein movement of the shims in this direction will raise or lower the toggles.

OBJECTS OF THE INVENTION

It is an object of the present invention to provide means for insuring a uniform closing force about the periphery of the pressure vessel door of the type wherein the door

2 is sealed in position by toggle bars engaged about the periphery of the pressure vessel opening.

Another object of the present invention is to provide means for varying the height from the door of the toggle bars used to secure the door of a pressure vessel in a sealed position.

A further object of the present invention is to provide a shim for use with a toggle bar locking mechanism of sterilizer doors wherein the shim is quickly and easily adjusted on the door to raise or lower the height of the toggle bar for obtaining a uniform sealing force about the entire periphery of the door.

These and other objects, advantages and characterizing features of the present invention will become more apparent upon consideration of the following detailed description thereof when taken in connection with the accompanying drawings depicting the same.

DESCRIPTION OF THE DRAWINGS

FIG. 3 is a perspective view of the adjustable shim of the present invention; and FIG. 4 is a perspective view, similar to FIG. 3, showing another embodiment of the invention.

DETAILED DESCRIPTION OF THE PREFERRED EMBODIMENTS

Figure 1:
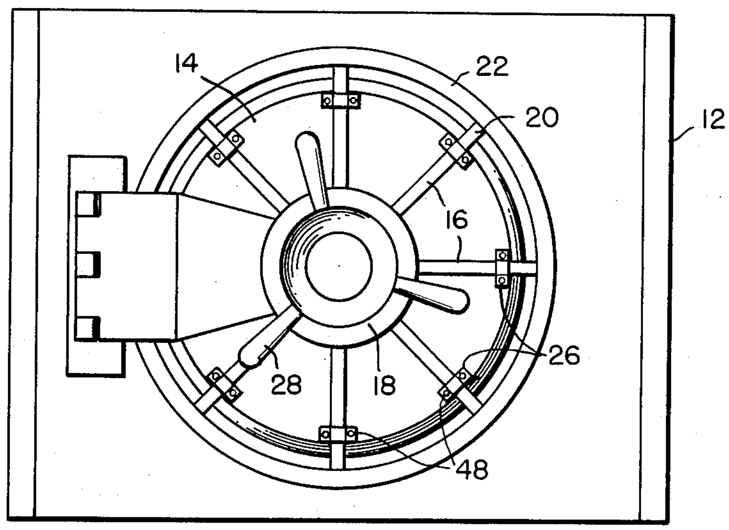
FIG. 1 is a front view of a typical sterilizer door wherein toggle bars are used for securing the door firmly in a sealed position.
Figure 2:
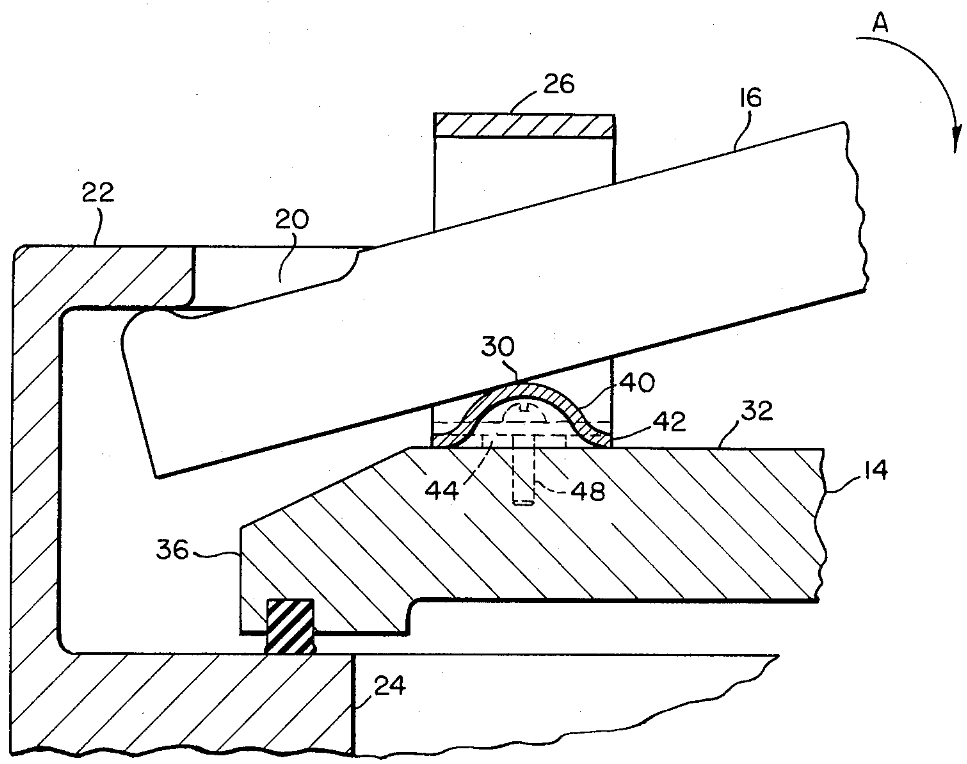
FIG. 2 is an enlarged view in section of a portion of the periphery of the door of FIG. 1.

Referring to the drawing, FIG. 1 shows a pressure vessel 12 such as a sterilizer or the like. While the invention may be used in many types of pressure vessels, the invention will be described for purposes of illustration only as if the pressure vessel were a sterilizer. Accordingly, the sterilizer door is shown at 14. The door is relatively conventional in construction, having a set of toggle or locking bars 16 carried by the door and extending radially outward from a central or hub portion 18 to various points about the door rim. The outer ends 20 of the bars are engaged under a lip 22 formed about the sterilizer opening 24 (FIG. 2). Yoke members 26 are provided for maintaining the general radial alignment of bars 16 when the door is in an open position.

The door itself operates in a conventional manner well known in the art and it is sufficient for purposes of the present invention merely to say that when the door is closed and a hand wheel 28 on hub 18 rotated, the hub is moved axially on the door to engage the toggle or locking bars 16 beneath lip 22 for purposes of prying the door against the sterilizer opening and securing the door firmly in a sealed position. This is illustrated in FIG. 2 wherein it is seen that movement of toggle bar 16 in the direction shown by arrow A will first cause end 20 of the bar to engage beneath lip 22 with further movement of the toggle then causing the toggle to bear against the door 14 at 30. This forces the door into a sealed position about the vessel opening 24. One problem presented by the construction of this type of door and locking mechanism is that a lip 22 may not be uniform about the entire periphery of vessel opening 24 so that the bearing pressure exerted by the toggle bars may not be uniform about the entire periphery of the door whereas a uniform bearing pressure is desired in order to insure the proper closure and sealing of the vessel opening.

In order to obtain a uniform bearing pressure, an adjustable shim 40 of the present invention is attached to the vessel door for receiving the force exerted by the toggle bars against the sterilizer door. This shim may be easily moved to the left or right as viewed in FIG. 2 to compensate for any irregularities in the lip 22 by raising or lowering the toggle bars.

Referring to FIG. 3, adjustable shim 40 is shown to include an elongated base member 42 with each end of the base member containing an elongated slot 44, the slots being parallel one to another. The center portion of this shim intermediate slots 44 contains a raised generally convex projection 46 which is oriented on the door generally parallel with the longitudinal axis of toggle bar 16 as represented by the phantom line 16*a*.

The shim is attached to the sterilizer door 32 by means of screws 48 (FIG. 2) which extend through the elongated slots and are threaded to the sterilizer door. For simplicity of construction and to locate the shim as close to the outer rim of the door as possible, the shim may be disposed within yoke member 26 and may be attached to the door with the same screws as attach the yoke to the door as shown in FIG. 2. With this arrangement, the shim is easily adjusted simply by loosening screws 48 and sliding the shim to the left or right as viewed in FIG. 2 to the proper position and then retightening these screws. The elongated slots 44 permit this lateral adjustment without the necessity of completely removing the screw and shim from the door. As set forth hereinabove, shifting the shim to the left or right as viewed in FIG. 2 has the effect of raising or lowering the toggle bar and therefore the bearing point 30 as required to insure uniform closing pressure about the entire periphery of the door. The curved shape of the shim insures a point contact with the toggle bar to provide a maximum concentration of force against the door.

Another embodiment of the adjustable shim is shown in FIG. 4. Here the shim 40*a* is designed for movement in a direction generally normal to the longitudinal axis of toggle bar 16 as represented by the phantom line 16*b*. In this respect, each end of the shim has an elongated slot 44*a* and the intermediate portion 46*a* of the shim has the shape of a one half right circular cone wherein the portion 50 of projection 46*a* adjacent the base of the cone is at a higher point than the portion 52 of the projection adjacent the apex of the cone. Both the slots and the axis of the cone are oriented on the base generally normal to the longitudinal axis 16*b* of the toggle bar. This arrangement would cause the bearing point 30 shown in FIG. 2 to raise or lower as the shim 40*a* is shifted in a direction into and out of the plane of FIG. 2 or normal to the longitudinal axis of toggle bar 16.

Thus, it should be appreciated that the present invention accomplishes its intended objects in providing an adjustable shim for use with pressure vessel doors of the type described which greatly facilitates adjustment of the closing mechanism to insure a uniform sealing force about the entire periphery of the door.

I claim:

1. In a pressure vessel with an opening which is sealed by a door of the type wherein toggle bars, which extend from a central hub portion to various points about the door rim, engage a lip about the vessel opening, the improvement comprising a plurality of adjustable shims, one shim being associated with each toggle bar, each of said adjustable shims comprising:

(a) a base member, each end of said base member having an elongated slot therein;

(b) a raised projection integral said base member intermediate the ends thereof, said projection being adapted to receive the bearing force of one of said toggle bars; and (c) fastening means extending through said slots for attaching said base member to said door beneath said one toggle bar, said elongated slots permitting movement of said base member with respect to said one toggle bar for raising or lowering the same with respect to said door.

2. The invention as set forth in claim 1 wherein said shims are located adjacent the rim of said door.

3. The invention as set forth in claim 1 wherein said fastening means comprises a screw extending through each elongated slot and threaded to said door.

4. The invention as set forth in claim 1 wherein said raised projection is generally the shape of one-half of a right circular cone, the axis of said cone and said elongated slots being oriented generally normal to the longitudinal axis of said toggle bar wherein movement of said shim transverse of said bar raises and lowers the same.

5. The invention as set forth in claim 1 wherein said elongated slots are oriented on said base generally parallel to the longitudinal axis of said toggle bars.

6. The invention as set forth in claim 2 wherein said raised projection is generally convex and oriented on said base generally parallel to the longitudinal axis of said slots and locking bar, said convex surface maintaining substantially point contact with said toggle bars as said shim is moved along the longitudinal axis of said toggle bar.

References Cited

UNITED STATES PATENTS

| | | | |
|---|---|---|---|
| 612,050 | 10/1898 | Morse | 220—55 Z UX |
| 1,144,152 | 6/1915 | Miller | 220—55 Z UX |
| 2,199,765 | 5/1940 | Velie | 220—55 Z UX |
| 2,470,776 | 5/1949 | Jewell | 21—98 X |
| 2,592,627 | 4/1952 | Ward | 292—7 X |
| 2,643,149 | 6/1953 | Mager | 292—341.18 |
| 3,173,572 | 3/1965 | Beeches | 292—7 X |
| 3,298,776 | 1/1967 | Beeches | 21—98 |
| 3,385,655 | 5/1968 | Huston et al. | 21—91 |
| 3,407,027 | 10/1968 | Huston | 21—91 |
| 3,511,593 | 5/1970 | Thomas et al. | 21—93 |

FOREIGN PATENTS

| | | | |
|---|---|---|---|
| 496,141 | 11/1938 | Great Britain | 23—290 |

BARRY S. RICHMAN, Primary Examiner

U.S. Cl. X.R.

21—93, 94, 96, 97, 98, 103; 23—290; 49—395; 220—55 W; 292—7

PO-1050
(5/69)

UNITED STATES PATENT OFFICE
CERTIFICATE OF CORRECTION

Patent No. 3,694,145 Dated September 26, 1972

Inventor(s) Charles H. Stevens

It is certified that error appears in the above-identified patent and that said Letters Patent are hereby corrected as shown below:

Column 1, line 46, "make" should be -- made --.

Claim 6, line 1, "2" should be -- 5 --.

Signed and sealed this 13th day of February 1973.

(SEAL)
Attest:

EDWARD M. FLETCHER, JR.
Attesting Officer

ROBERT GOTTSCHALK
Commissioner of Patents